US010815767B2

(12) United States Patent
Thursby et al.

(10) Patent No.: US 10,815,767 B2
(45) Date of Patent: *Oct. 27, 2020

(54) INSPECTION ASSEMBLY VIEWPORT

(71) Applicant: E.V. OFFSHORE LIMITED, Norwich (GB)

(72) Inventors: Jonathan Thursby, Norwich (GB); Shaun Peck, Oulton Broad (GB); Jonathan Brian Rudd, Norwich (GB)

(73) Assignee: E.V. Offshore Limited, Norwich (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/479,029

(22) PCT Filed: Jan. 19, 2018

(86) PCT No.: PCT/GB2018/050162
§ 371 (c)(1),
(2) Date: Jul. 18, 2019

(87) PCT Pub. No.: WO2018/134613
PCT Pub. Date: Jul. 26, 2018

(65) Prior Publication Data
US 2019/0330969 A1    Oct. 31, 2019

(30) Foreign Application Priority Data

Jan. 20, 2017 (GB) .................................. 1701012.5
Nov. 10, 2017 (GB) .................................. 1718635.4

(51) Int. Cl.
*H04N 7/18* (2006.01)
*E21B 47/002* (2012.01)
(Continued)

(52) U.S. Cl.
CPC ............ *E21B 47/002* (2020.05); *G03B 17/02* (2013.01); *G03B 37/005* (2013.01);
(Continued)

(58) Field of Classification Search
CPC .. E21B 47/0002; H04N 5/247; H04N 5/2256; H04N 5/2253; H04N 5/2252; H04N 2005/2255; G03B 37/005; G03B 17/02
(Continued)

(56) References Cited

U.S. PATENT DOCUMENTS

| 4,929,070 A | 5/1990 | Yokota et al. |
| 2004/0019252 A1* | 1/2004 | Hirata ................ G02B 23/2476 600/114 |

(Continued)

FOREIGN PATENT DOCUMENTS

| GB | 2270099 A | 3/1994 |
| WO | 2012066309 A1 | 5/2012 |

OTHER PUBLICATIONS

Tomás Gómez Alvarez-Arenas et al, Air coupled and water immersion sectorized array transducers for industrial and medical endoscopy (Year: 2017).*

*Primary Examiner* — Shan E Elahi
(74) *Attorney, Agent, or Firm* — Hayes Soloway P.C.

(57) ABSTRACT

Inspection assemblies that include one or more sideview cameras for capturing images of an interior surface of a pipe or conduit include an elongate housing, a sideview camera within the housing and arranged to capture an image of a region within a field of view external to the housing, and a viewport element mounted in the housing and located such that light is transmitted through the viewport element and into said sideview camera, wherein the viewport element is diffusion bonded to a metal support.

20 Claims, 2 Drawing Sheets

(51) Int. Cl.
*G03B 17/02* (2006.01)
*G03B 37/00* (2006.01)
*H04N 5/225* (2006.01)
*H04N 5/247* (2006.01)

(52) U.S. Cl.
CPC ......... *H04N 5/2252* (2013.01); *H04N 5/2253* (2013.01); *H04N 5/2256* (2013.01); *H04N 5/247* (2013.01); *H04N 2005/2255* (2013.01)

(58) Field of Classification Search
USPC .......................................................... 348/84
See application file for complete search history.

(56) References Cited

U.S. PATENT DOCUMENTS

| | | | |
|---|---|---|---|
| 2011/0295066 A1* | 12/2011 | Fan | A61B 1/015 |
| | | | 600/114 |
| 2013/0235176 A1 | 9/2013 | Miyano | |
| 2015/0109433 A1 | 4/2015 | Thursby et al. | |
| 2015/0294463 A1* | 10/2015 | Takahashi | G06T 7/64 |
| | | | 348/71 |
| 2016/0259237 A1* | 9/2016 | Harris | H04N 7/185 |

* cited by examiner

INSPECTION ASSEMBLY VIEWPORT

CROSS-REFERENCE TO RELATED APPLICATIONS AND PRIORITY

This patent application claims priority from International Patent Application No. PCT/GB2018/050162 filed Jan. 19, 2018, which claims the benefit of GB 1701012.5 filed Jan. 20, 2017, and GB 1718635.4 filed Nov. 10, 2017. Each of these patent applications are herein incorporated by reference in their entirety.

BACKGROUND

This invention relates to inspection assemblies that include one or more sideview cameras for capturing images of an interior surface of a pipe or conduit. This invention also relates to downhole inspection tools including such inspection assemblies.

A number of downhole tools exist that are able to provide a 360° view of an internal surface of a pipe or conduit. These tools are generally configured in one of three ways.

In a first type of inspection tool a camera having a wide angle of view is positioned at an end or tip of the tool. The field of view of the camera comprises a region ahead of the tool and includes a view of the internal surface of the pipe or conduit at a distance from the end of the tool. One disadvantage of this configuration is that the resultant image captured by the camera is highly distorted, especially at the periphery which includes the region of interest, namely the internal surface of the pipe. In particular, optical compression increases near the edges of the image resulting in a low resolution 360° view.

A second type of inspection tool includes a single, sideview camera that is mounted to view a region of the internal surface of the pipe located radially outwardly of the inspection tool. In order to capture a 360° view, the camera must be rotated about an axis of the tool. This has a number of disadvantages. Firstly, the motor may fail while the tool is deployed downhole, thereby restricting the images that may be captured. Secondly, the 360° view is typically achieved by rotating the camera and capturing a series of images that are then processed to create the full 360° image. This is a slow process and one that can only be practically implemented over a small area. Thirdly, for inspection tools that are memory only, i.e. they have no real-time link to an operator, there is no ability to rotate the camera. This solution is, therefore, not possible to implement in inspection tools deployed on slickline cable.

A third type of inspection tool utilises a plurality of cameras located around the circumference of the tool. The camera positions and the angle of view of each of the cameras are selected such that the cameras are able to cover a full 360° view of the internal surface of the pipe or conduit. The images captured by each of the cameras are then processed and stitched together to create the full 360° view. Again this is a time consuming process and one that can only be practically implemented over a small area. Furthermore, it is difficult to obtain images with low enough distortion to enable accurate post processing.

It is an object of the present invention to provide an improved downhole inspection tool including means to capture images of a 360° view of an internal surface of a pipe or conduit that overcomes a disadvantage of prior art downhole inspection tools whether referred to herein or otherwise.

SUMMARY OF THE INVENTION

According to the present invention there is provided an inspection assembly comprising:
an elongate housing;
a sideview camera within the housing and arranged to capture an image of a region within a field of view external to the housing; and
a viewport element mounted in the housing and located such that light is transmitted through the viewport element and into said sideview camera, wherein the viewport element is diffusion bonded to a metal support.

The metal support may be part of the housing of the inspection assembly.

The viewport element is preferably made of sapphire. The metal support may be made of titanium or a nickel alloy.

The viewport element is preferably bonded to the metal support around a circumferential edge of the viewport element.

The viewport element preferably has a concave internal surface, closer to the camera, and a convex external surface, further from the camera, such that the viewport element has the shape of a spherical cap. In some embodiments a centre of radius of curvature of the internal surface is closer to the viewport element than a centre of radius of curvature of the external surface. In these embodiments the viewport element acts as a negative meniscus lens.

The inspection assembly is particularly suited to the inspection of passageways or conduits and may be used to inspect or capture images of a wellbore or casing.

The side view camera is preferably mounted such that the centre line or optical axis of the field of view extends in a direction transverse to, and in particular substantially perpendicular to, a longitudinal axis of the housing. The camera may include an image sensor or optical sensor and one or more lenses, in addition to the viewport element.

In particularly preferred embodiments the housing is substantially cylindrical. The camera may be positioned so as to capture images of a region located radially outward of the housing.

The inspection assembly preferably comprises a plurality of side view cameras arranged to image different but overlapping fields of view. A plurality of cameras are preferably arranged in a circumferential array. The cameras may be arranged to image a 360° annular region surrounding the inspection assembly.

In order to illuminate the field of view of the or each side view camera, the inspection assembly preferably includes one or more light sources disposed at a location spaced apart from the camera along the longitudinal axis. Preferably a first light source is disposed on a first side of the or each camera and a second light source is disposed on a second side of the or each camera. A line extending between the first and second light sources may extend parallel to the longitudinal axis of the housing.

The light source or light sources may be angled such that a centre line or optical axis of a beam of light emitted by the light source is at an angle of less than 90° to the longitudinal axis of the housing. In embodiments including a first light source on a first side of the camera and a second light source on a second side of the camera, the first and second light sources are preferably angled such that the centre lines or optical axes of the beams of light emitted by the light sources are convergent.

In a preferred embodiment of a downhole inspection assembly according to the invention a plurality of light emitters are arranged in a circumferential array. In particular, a plurality of lights are disposed around a circumferential region of housing and are configured to emit light in a radially outwards direction such that an annular region surrounding the inspection assembly is illuminated.

The inspection assembly may include a window element mounted in the housing, the element comprising a light transmitting material and being located such that light emitted by a light source passes through the window before illuminating the field of view.

In embodiments including a circumferential array of light sources the window element may be annular and extend around a circumference of the inspection assembly. The internal surface of the annular window element is preferably cylindrical. The external surface of the annular window element preferably has a saddle shape or comprises a surface with negative curvature. In preferred embodiments, therefore, the window element effectively acts as a plano-concave lens.

In order to provide more even illumination of the field of view of the camera or cameras the inspection assembly may comprise a first set of light emitters and a second set of light emitters, each set of light emitters being in a circumferential array and configured to illuminate an annular region around the inspection tool. Preferably the first set of light emitters are located in a first plane on a first side of the one or more cameras and the second set of light emitters are located in a second plane on a second, opposite side of the one or more cameras. The first and second planes are preferably perpendicular to the longitudinal axis and the first and second planes are preferably spaced apart along the longitudinal axis.

The inspection assembly will preferably be a downhole inspection assembly for imaging the internal surface of a borehole or casing, but may be used to image the internal surface or other internal features of a pipe, conduit or channel within which the inspection assembly is located. When configured as a downhole inspection assembly, the inspection assembly may be connected to and deployed on electric line, slickline, or coiled tubing.

Accordingly, the invention also provides a downhole tool for imaging the internal surface of a borehole or casing comprising an inspection assembly according to the invention connected to and deployed on electric line, slickline, or coiled tubing. The downhole tool may further comprise a bore configured to allow a flow of fluid through the tool.

The invention also provides a tool string comprising a downhole tool according to the invention and at least one other downhole tool.

BRIEF DESCRIPTION OF THE DRAWINGS

The invention will now be further described by way of example only and with reference to the accompanying drawings, in which.

DETAILED DESCRIPTION

Figure 1:
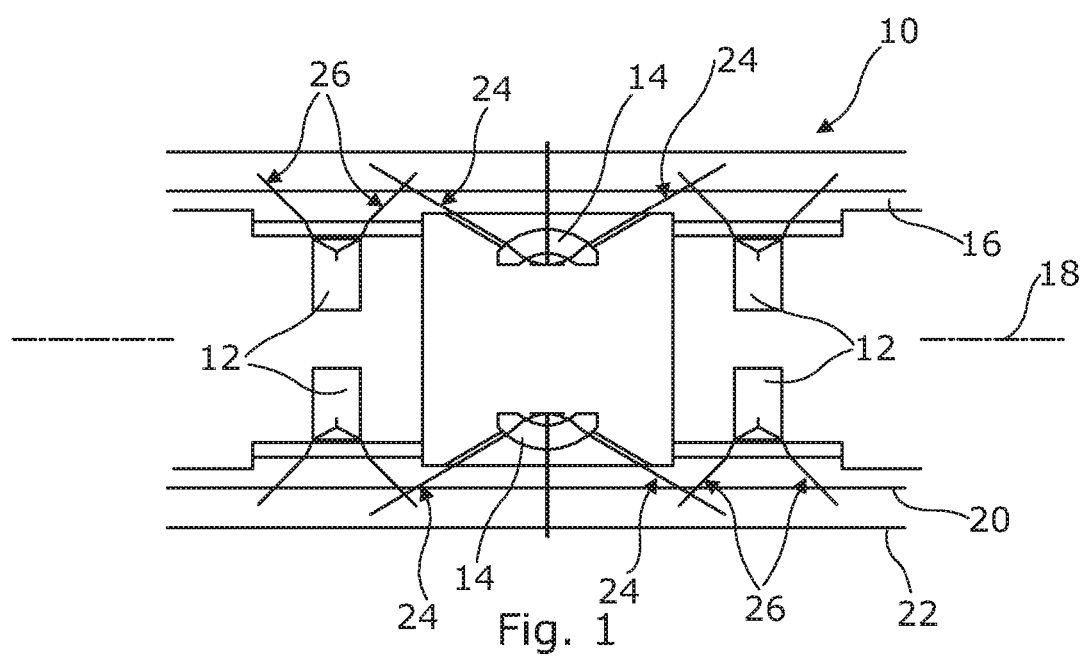
FIG. 1 is a schematic diagram illustrating a part of a prior art downhole inspection tool including side view cameras and lighting, and shows, in particular, a field of view of a camera and the extent of illumination of a wall of a conduit by lighting devices positioned either side of the camera along an axis of the tool.

FIG. 1 illustrates a prior art inspection tool 10 having an arrangement of side view cameras and associated light sources 12. The cameras capture images of a field of view through a viewport 14 in a housing 16 of the inspection tool 10. The light sources 12 are disposed on either side of the viewport 14 along a longitudinal axis 18 of the inspection tool 10. The cameras are arranged to view an internal surface of a wellbore, and FIG. 1 illustrates the position of an internal surface of a smaller diameter wellbore 20 and an internal surface of a larger diameter wellbore 22 relative to the inspection tool 10. The angular extent of a field of view of each of the cameras is illustrated by a first pair of diverging lines 24, and the angular extent of the light emitted by first and second light sources 12 on either side of the camera is illustrated by two further sets of diverging lines 26.

In order to form a composite and complete 360° image of the internal surface of a wellbore, the side view cameras are preferably arranged in a single plane transverse to the longitudinal axis 18. To allow the camera to fit within a maximum tool external diameter of about 43 mm, the optics of the cameras must be very compact, and preferably less than 12 mm from the image plane to the front optic.

The inspection tool is ideally designed to image the internal surface of a pipe or conduit having a minimum internal diameter of about 50 mm. To achieve a full 360° view of this surface the lens of the camera must be wide angle, preferably greater than 130°, while exhibiting low distortion, preferably less than 10%, for accurate post processing and mosaicing of the images. Typically this requires a complex hyperbolic lens which is difficult to manufacture in a compact physical size without using optics made of a polymeric or plastics material. The inspection tool of the present invention is, however, required to operate downhole in temperatures up to 150° C., and therefore the use of polymeric materials is restricted.

Furthermore, the inspection tool must be able to withstand pressures of up to 15 kpsi (103 MPa). To withstand this pressure the viewport of the inspection tool is preferably made of a material that has a high tensile strength such as sapphire. Sapphire also has the advantage that it is very hard and resistant to impacts and scratches. The sapphire viewports preferably have a minimum thickness of 4 mm to withstand the pressures of up to 103 MPa. It is known, however, that sapphire has a high refractive index of 1.7.

Figure 2:
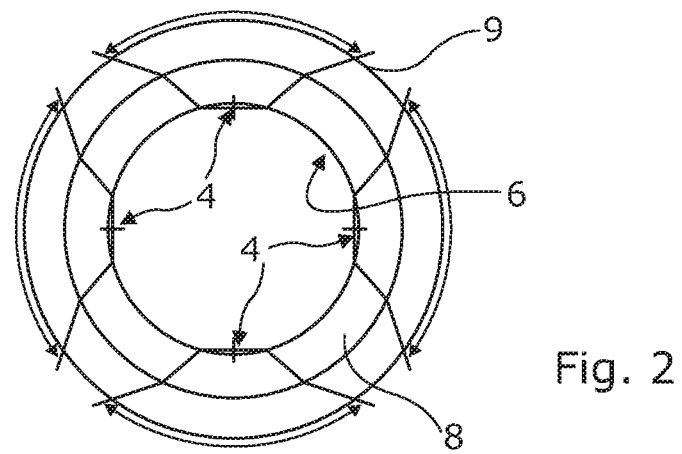
FIG. 2 shows the impact of a sapphire window on the angular extent of a field of view of a plurality of cameras imaging an internal surface of a pipe.

FIG. 2 illustrates a camera assembly including four cameras having their focal points 4 proximate an inner surface 6 of a cylindrical sapphire window 8 extending around a circumference of the tool. If the sapphire window 8 were not present the fields of view of the cameras would be such that they would image a complete 360° view of an internal surface of a pipe. The inclusion of the sapphire window 8, however, acts to restrict the fields of view of the cameras (indicated by the double ended arrows) such that they can no longer view a complete 360° surface of a pipe 9. The inclusion of the sapphire window 8, therefore, effectively increases the minimum internal diameter of the pipe for which a full 360° image may be captured.

Figure 3:
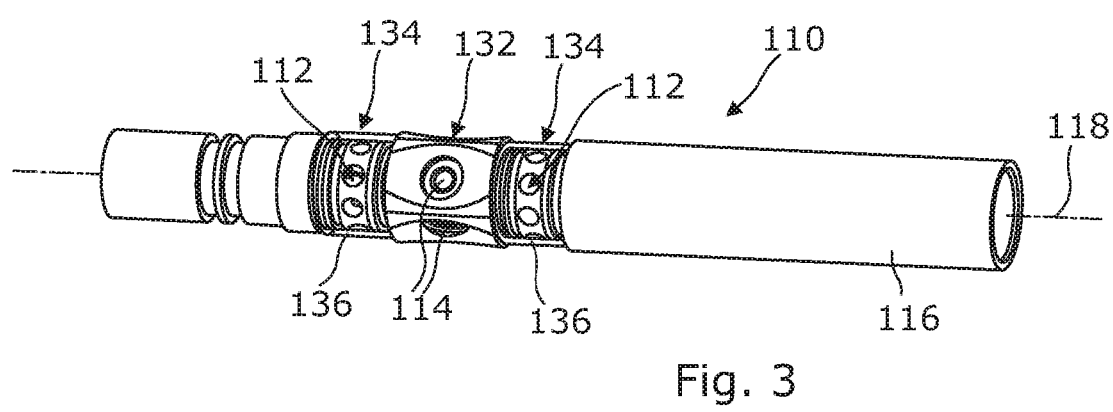
FIG. 3 is a perspective view of part of a downhole inspection tool according to an embodiment of the present invention.
Figure 4:
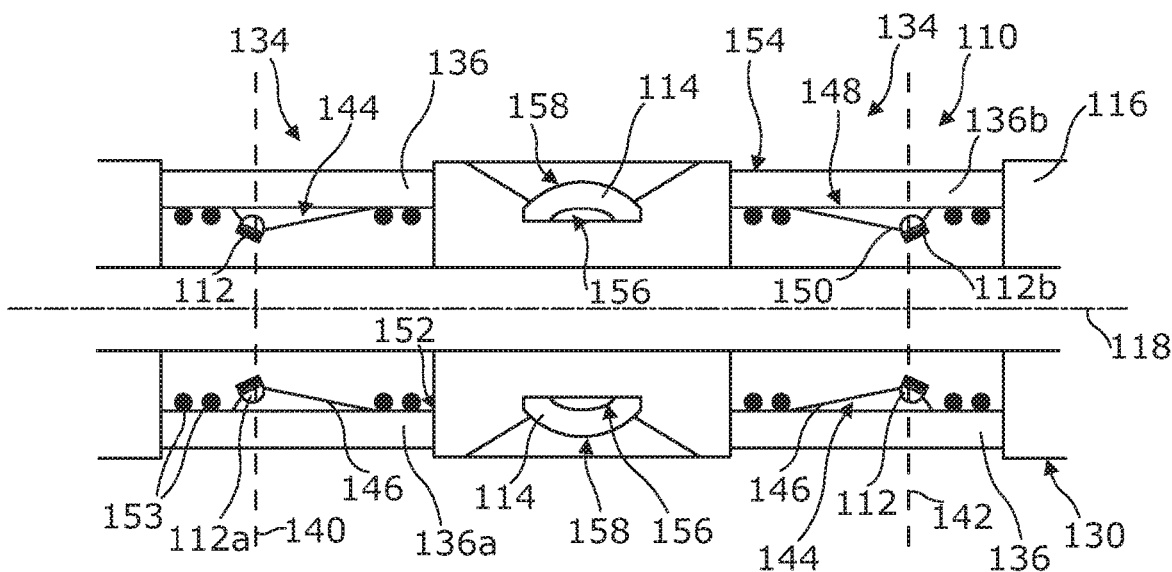
FIG. 4 is a longitudinal cross-sectional view of a part of the downhole inspection tool of FIG. 3.

FIGS. 3 and 4 show an inspection assembly or tool 110 according to a preferred embodiment of the present invention. The inspection assembly 110 comprises an elongate housing 116 having a longitudinal axis 118. The housing 116 is generally cylindrical and includes a substantially annular side wall 128. The housing side wall 128 has an outer surface 130 that defines an outer or external diameter of the inspection assembly 110.

The inspection assembly 110 preferably has a maximum external diameter of about 43 mm to allow it to view internal surfaces of boreholes or pipes having internal diameters of, for example, between 50 mm and 65 mm. The maximum external diameter may be between 30 mm and 50 mm, and is more preferably between 40 mm and 45 mm.

The inspection assembly 110 further comprises a camera section 132 and two lighting sections 134 including light sources arranged to emit light to illuminate the field of view of the camera(s). The camera section 132 includes a plurality of cameras arranged to capture images through a plurality of viewports 114 formed in the housing 116. Each lighting section 134 comprises a plurality of light sources 112 and a light transmitting window element 136 covering the light sources.

The inspection assembly 110 will typically be used to image an internal surface of a pipe or conduit within which the inspection assembly 110 is located. In particular, the inspection assembly 110 of the present invention may be used to image an internal surface of a wellbore or casing. The wellbore or casing may have an internal diameter of between 50 mm and 255 mm. The external diameter of the inspection assembly 110, therefore, preferably does not exceed 43 mm. Furthermore, the inspection assembly 110 must be able to operate in temperatures up to 150° C. and at pressures of up to 15 kpsi (103 MPa).

When the inspection assembly 110 is used to image a wellbore or casing, the inspection assembly 110 may be deployed on slickline cable or e-line cable. If the inspection assembly is deployed on slickline cable, images captured by the one or more cameras are stored in a memory of the inspection assembly. If the inspection assembly 110 is deployed on e-line cable, images captured by the one or more cameras may be stored in a memory of the inspection assembly and/or transmitted in real-time to a receiver which will typically be located at ground level. Deploying the inspection assembly 110 on e-line cable therefore allows live images to be transmitted to a controller at a location remote from the inspection assembly and/or wellbore.

The camera or cameras of the inspection assembly 110 may capture still images and/or video images. Images may be captured at up to 25 frames per second.

In this embodiment the inspection assembly 110 includes four cameras arranged to capture an image of an internal surface of the wellbore or conduit surrounding the inspection assembly 110. The four cameras are referred to as sideview cameras and are configured such that an optical axis of the field of view of each of the cameras extends substantially radially from the inspection assembly.

Each camera comprises an image sensor and at least one lens. In use, light from the field of view passes through the lens and impinges the image sensor. It will be appreciated that the image sensor may be optically aligned with the lens or, alternatively, a prism or mirror may be positioned between the lens and the image sensor such that the optical path between the lens and the image sensor is bent through an angle of, for example, about 90°.

It is preferable if the camera lens is disposed as near to the centreline or axis 118 of the tool as possible. In a preferred embodiment, comprising four cameras, each camera (including the image sensor and lens) is mounted on a printed circuit board (PCB) which is, in turn, mounted on a support bar or rod that extends along the axis 118 of the tool. In one embodiment the support bar has a substantially square cross-sectional shape and a PCB is mounted on each face of the bar. The support bar may be hollow and may provide a heat pipe arranged to cool the image sensors.

To minimise the cross-sectional dimension of the support bar, so that the image sensors are as close to the axis 118 of the tool as possible, each of the PCBs preferably has chamfered edges, and the chamfered edges of neighbouring PCBs are in abutting contact when mounted on the support bar. It will be appreciated that if there are fewer or more than four cameras, the support bar may have fewer or more faces on which the associated PCBs are mounted.

The viewports 114 in front of each of the cameras are, preferably, spaced apart equidistantly around the circumference of the housing 116 of the inspection assembly 110. In order to form a composite and complete 360° image of the internal surface of a wellbore, the side view cameras and viewports 114 are preferably arranged in a single plane transverse to the longitudinal axis 118 of the inspection assembly 110.

Each of the two lighting sections 134 includes a lighting array, and the lighting arrays are located adjacent the sideview cameras to illuminate the field of view. The lighting arrays are spaced apart in a direction along the longitudinal axis 118 of the inspection assembly 110 and a first array, in a first lighting section, is located on a first side of the cameras and a second array, in a second lighting section, is located on a second side of the cameras.

The first array or first set of light emitters 112a is disposed circumferentially around the housing 116 and configured to illuminate an annular region around the inspection assembly 110. The second array or second set of light emitters 112b is also disposed circumferentially around the housing 116 and configured to illuminate an annular region around the inspection tool 110. The first set of light emitters 112a is located in a first plane 140 on a first side of the cameras and the second set of light emitters 112b is located in a second plane 142 on a second, opposite side of the cameras. In particular the first set of light emitters 112a is disposed between the camera viewport(s) 114 and a first end of the housing 116 and the second set of light emitters 112b is disposed between the camera viewport(s) 114 and a second end of the housing 116. The first and second planes 140, 142 are preferably substantially perpendicular to the longitudinal axis 118 and the first and second planes 140, 142 are preferably spaced apart along the longitudinal axis 118 of the inspection assembly 110.

Each of the light emitters 112 is mounted in or disposed within a recess 144 in a part of the outer surface 130 of the housing 116. Each recess 144 preferably has a substantially conical or tapered sidewall 146 such that an opening 148 in the outer surface 130 of the housing 116 has a larger diameter than a base 150 of the recess 144. In this embodiment each light emitter 112 is preferably located at the base 150 of the recess 144. In other embodiments the light emitters 112 may be mounted on or in the sidewall 146 of the recess 144.

In preferred embodiments each of the light sources 112 is mounted in a recess 144 at an angle of less than 90° to the longitudinal axis 118 and such that a centreline or optical axis of the light emitted by the light source 112 extends in a direction towards the centre of the field of view of the camera. In order to maximise the intensity of light illuminating the field of view the conical recess 144 is also angled. Preferably an angle between a part of the recess sidewall 146 closest to the camera viewport 114 and the longitudinal axis 118 of the housing 116 is smaller than an angle between a part of the recess sidewall 146 furthest from the camera viewport 114 and the longitudinal axis 118. In other words, the slope of part of the sidewall 146 of the recess 144 closer to the camera viewport 114 is shallower than the slope of part of the sidewall 146 of the recess 144 further from the camera viewport 114.

In some embodiments a single recess in the form of a circumferential channel is provided in the sidewall 128 or outer surface 130 of the housing 116. The recess preferably comprises a first sidewall extending circumferentially around the housing, a second sidewall extending circumferentially around the housing, and a base extending between the sidewalls. The light emitters 112 may be mounted in or on the base or one of the sidewalls of the channel. Preferably the light emitters are mounted on the first sidewall facing in a direction substantially towards the camera section 132 of the inspection assembly 110.

In some embodiments each set of light emitters 112a, 112b comprises a first sub-set of light emitters and a second sub-set of light emitters. A centreline or optical axis of each light emitter 112 in the first sub-set is at a first angle to the longitudinal axis 118. A centreline or optical axis of each light emitter 112 in the second sub-set is at a second angle to the longitudinal axis 118. Both the first and second angles are less than 90° and the first angle is less than the second angle. Each of the sub-sets of light emitters 112 is configured to illuminate a different diameter of pipe. Preferably, each of the sub-sets is separately controllable and is preferably separately dimmable.

A cylindrical window element 136 extends around part of the outer surface 130 of the housing 116 and covers each of the recesses 144 corresponding to light emitters 112 in one of the lighting arrays. As such, a first window element 136a extends around the housing 116 and covers the first set of light emitters 112a and a second window element 136b extends around the housing 116 and covers the second set of light emitters 112b.

Each of the window elements 136 is made from a single piece of light transmitting material. Preferably each of the window elements 136 is made from sapphire. Each of the window elements preferably has a thickness of between 3.5 mm and 6.0 mm and more preferably between 4 mm and 5.5 mm. Each window element 136 has a cylindrical inner surface 152 that contacts a part of the outer surface 130 of the housing 116 around the recesses 144. Suitable o-rings 153 may be located between the inner surface 152 of the window element 136 and a part of the housing 116 in order to create the required seal between the window element 136 and the housing 116. An outer surface 154 of the window element 136 forms a part of an external surface of the inspection assembly 110.

In some embodiments it may be desirable if an optically clear fluid is disposed between the light emitters 112 and the inner surface 152 of the window element 136. The optically clear fluid may fill the recess or recesses 144 in which the light emitters 112 are disposed. The optically clear fluid may be in the form of a liquid or a gel. In preferred embodiments the optically clear fluid is a silicone fluid or silicone gel.

The presence of a suitable fluid between the light emitters 112 and the window element 136 results in a more even spread of light emitted from the window element 136, although the intensity of the light emitted may decrease overall, leading to a more even illumination of the field of view. If the fluid behind the window element 136 is under pressure, this may result in an improved pressure rating of the window element 136. This may allow a reduction in thickness of the window element 136, thereby reducing material costs, while still being able to withstand the high pressures experienced at depth downhole. Accordingly, in some embodiments in which a pressurised fluid is disposed behind the window element 136, the window element 136 may have a minimum thickness of 2 mm or 3 mm.

Each of the viewport elements 114 in front of each of the cameras has a concave internal surface 156, closer to the camera, and a convex external surface 158, further from the camera. In this way the viewport element 114 is substantially dome-shaped or substantially in the shape of a spherical cap. The radius of curvature of the internal surface 156 is smaller than the radius of curvature of the external surface 158. Furthermore, and importantly, the centre of radius of curvature of the internal surface 156 is closer to the viewport element 114 than the centre of radius of curvature of the external surface 158. In this way, a central region of the viewport element 114 is thinner than a circumferential or outer region of the viewport element, and the viewport element, therefore, acts as a negative meniscus lens.

Figure 6:
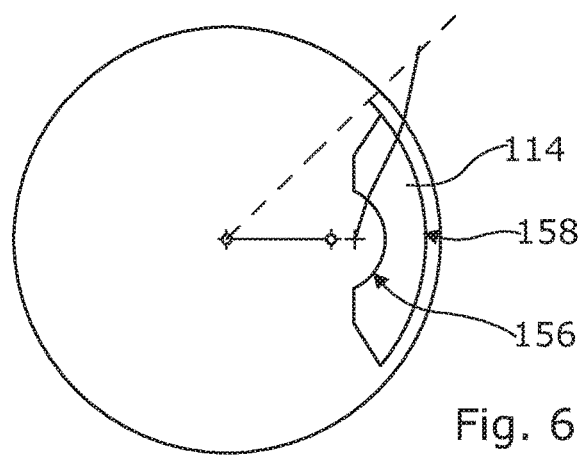
FIG. 6 is a diagram illustrating the effect of the shape of a viewport element according to the present invention on the field of view of a side view camera.

In a preferred embodiment, illustrated in FIG. 6, the radius of curvature of the internal surface 156 is 5.5 mm and the radius of curvature of the external surface 158 is 20 mm, and the centre of the radius of curvature of the internal surface 156 is 10.5 mm closer to the internal surface 156 of the viewport element 114 than the centre of the radius of curvature of the external surface 158.

It will be appreciated that the size and shape of the viewport elements 114, and in particular the radii of curvature of the internal and external surfaces 156, 158 of the viewport elements 114, may be changed to suit different cameras and different sizes of inspection assembly 110. The dimensions of the viewports 114 may also be changed to view pipes or conduits having different internal diameters, where the surface to be imaged is at a different distance from the housing of the inspection assembly, and to account for different fluids within the pipe or conduit.

It will be appreciated that the viewport element 114 acts to protect the camera and other internal components of the inspection assembly from the conditions encountered in a wellbore or other conduit. The external surface 158 of the viewport element 114 is in contact with the fluids and other substances within the wellbore, and the viewport element 114 must be able to withstand the temperatures and pressures encountered in the wellbore. Accordingly, each viewport element 114 is preferably made from sapphire.

By including a viewport element that has the shape of a meniscus lens, the viewport element acts as the objective lens in the camera assembly. In this way, a greater angular field of view of the internal surface of a pipe can be achieved in pipes having smaller internal diameters with a narrower field of view from an intermediate lens in the camera assembly when compared with the use of a viewport element having a constant thickness across its diameter.

Figure 5:
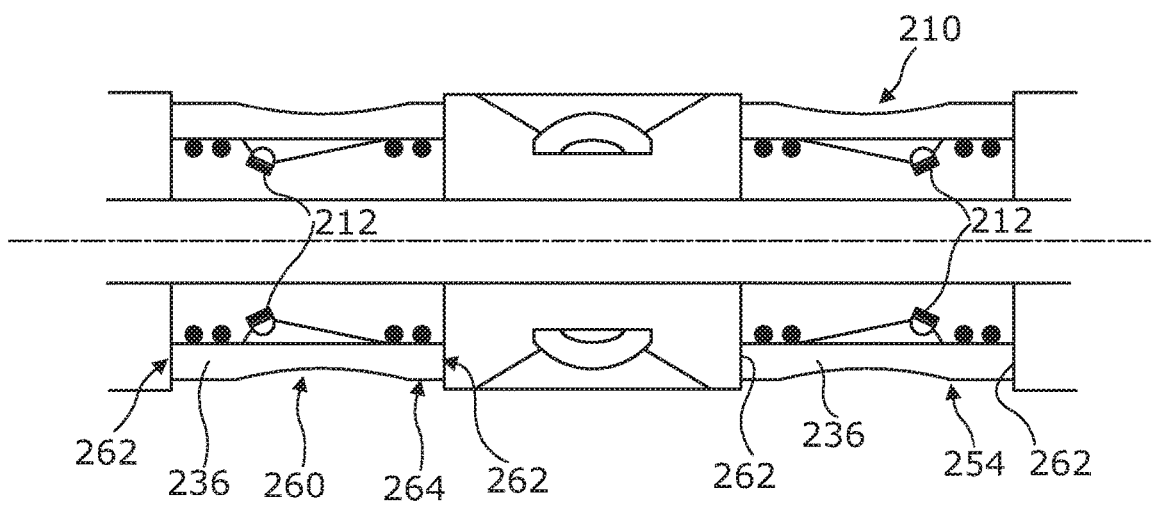
FIG. 5 is a longitudinal cross-sectional view of a part of a second embodiment of a downhole inspection tool according to the invention.

FIG. 5 illustrates a further embodiment of an inspection assembly or tool 210. The inspection assembly 210 of this embodiment is substantially the same as the inspection assembly 110 of the previous embodiment and like features have been indicated with reference numerals incremented by 100.

In this embodiment an outer or external surface 254 of a window element 236 in front of each of the lighting arrays comprises a concave region 260. The concave region 260 may be centrally located along the length or width of the window element 236 (defined between edges 262 of the window element 236) and extend fully around the annular window element 236. In this way, edge regions 264 of the outer surface 254 may be cylindrical and the concave region 260 may be in the form of a circumferentially extending concave channel.

The window element 236 of this embodiment effectively acts as a plano-concave lens in front of each of the light sources 212. In this way the light emitted by the light sources 212 is distributed more evenly over the area of the fields of view of the cameras, even in very small pipe diameters. Accordingly, smaller light sources can be used to achieve the required illumination compared to prior art systems. This is particularly advantageous when the maximum external diameter of the inspection assembly or tool is limited by a specific application.

A maximum external diameter of the window element 236 may be 40 mm. A maximum thickness of the window element 236 may be 5.5 mm. A minimum thickness of the window element 236 may be 4 mm. The maximum thickness of the window element 236 may be proximate the edges 262 and the minimum thickness may be in a central region, and the difference between the maximum and minimum thicknesses may be due to the concavity of the outer surface 254 of the window element 236.

According to the present invention the inspection assembly 110, 210 includes multiple cameras on the same plane transverse or perpendicular to the longitudinal axis 118, 218 of the assembly 110, 210 in order to capture a full 360° view of the internal surface of a pipe or wellbore. As such, the space available for each of the cameras is limited. Furthermore, there is limited space to form the required seals between the viewport elements 114, 214 and the housing 116, 216 around the circumference of the inspection assembly 110, 210.

In each of the above described embodiments of the present invention, therefore, the viewport element 114, 214 is preferably diffusion bonded to a metal support 166, 266. The metal support 166, 266 is preferably a part of the housing 116, 216 of the inspection assembly 110, 210. This removes the requirement for traditional o-rings and/or retaining rings to form a seal between the viewport element 114, 214 and the housing 116, 216. The metal support 166, 266 may include attachment means for securing and sealing the metal support 166, 266 to other sections of the housing 116, 216 of the inspection assembly 110, 210.

The viewport element 114, 214 is preferably bonded to the metal support 166, 266 around a circumferential edge of the viewport element 114, 214. The circumferential edge may comprise an edge surface that extends at least partially between an external or front surface 158 of the viewport element 114, 214 and an internal or rear surface 156 of the viewport element 114, 214.

In preferred embodiments the viewport element 114, 214 is made from sapphire and the metal support 166, 266 is preferably made from titanium or a nickel alloy such as inconel. Preferably, a bond layer of aluminium is introduced between the viewport element 114, 214 and the metal support 166, 216 to act as a 'glue' and aid in the diffusion bonding process. Other soft metals may be used to form the bond layer; however, the bond layer should be compliant.

The inspection assembly of the present invention may be deployed in a downhole tool having a flow through channel. In these embodiments the tool may comprise a bore extending longitudinally along the tool, the bore permitting fluids to flow through the tool. The tool may have a substantially annular or tubular main body. A plurality of side view cameras may be spaced apart around the main body to image an annular field of view around the tool.

In other embodiments the inspection assembly of the present invention may be deployed in a downhole inspection tool having means to connect the inspection tool to another downhole tool to form a tool string. The tool string may include a flowmeter such as a spinner or another camera such as a down view camera. The tool string may include another inspection assembly and/or a mechanical tool.

The present invention therefore provides an inspection assembly having improved illumination of a field of view of a camera.

The invention claimed is:

1. An inspection assembly for imaging the internal surface of a pipe or conduit comprising:
   an elongate housing;
   a sideview camera within the housing and arranged to capture an image of a region within a field of view external to the housing; and
   a viewport element mounted in the housing and located such that light is transmitted through the viewport element and into said sideview camera,
   wherein the viewport element is diffusion bonded to a metal support.

2. An inspection assembly as claimed in claim 1, wherein the metal support is a part of the housing.

3. An inspection assembly as claimed in claim 1, wherein the viewport element is made of sapphire and the metal support is made of titanium or a nickel alloy.

4. An inspection assembly as claimed in claim 1, wherein the viewport element is bonded to the metal support around a circumferential edge of the viewport element.

5. An inspection assembly as claimed in claim 1, wherein the viewport element has a concave internal surface, closer to the camera, and a convex external surface, further from the camera.

6. An inspection assembly as claimed in claim 5, wherein a centre of radius of curvature of the internal surface is closer to the viewport element than a centre of radius of curvature of the external surface.

7. An inspection assembly as claimed in claim 1, wherein the side view camera is mounted such that the optical axis of the field of view extends in a direction substantially perpendicular to a longitudinal axis of the housing.

8. An inspection assembly as claimed in claim 1, comprising a plurality of sideview cameras and the cameras are arranged in a circumferential array.

9. An inspection assembly as claimed in claim 1, further comprising one or more light sources disposed at a location spaced apart from the camera along a longitudinal axis of the housing.

10. An inspection assembly as claimed in claim 9, wherein a first one of said light sources is disposed on a first side of the or each camera and a second one of said light sources is disposed on a second side of the or each camera.

11. An inspection assembly as claimed in claim 10, wherein the first and second light sources are angled such that centre lines of the beams of light emitted by the light sources are convergent.

12. An inspection assembly as claimed in claim 9, wherein the or each light source is angled such that a centre line of a beam of light emitted by the light source is at an angle of less than 90° to the longitudinal axis of the housing.

13. An inspection assembly as claimed in claim 9, wherein the or each light source comprises a plurality of light emitters arranged in a circumferential array and the plurality of light emitters are disposed around a circumferential region of the housing and the light emitters are configured to emit light in a radially outwards direction such that an annular region surrounding the housing is illuminated.

14. An inspection assembly as claimed in claim 13, comprising a first circumferential array of light emitters lying in a first plane on a first side of the cameras and a second circumferential array of light emitters lying in a second plane on a second side of the cameras, the first and second planes being substantially perpendicular to the longitudinal axis and the first and second planes being spaced apart along the longitudinal axis.

15. An inspection assembly as claimed in claim 9, further comprising a window element mounted in the housing, the window element comprising a light transmitting material and being located such that light emitted by the light source or at least one of said light sources passes through the window element before illuminating the field of view.

16. An inspection assembly as claimed in claim 15, wherein the window element is annular.

17. An inspection assembly as claimed in claim 15, wherein an external surface of the window element comprises a concave region.

18. A downhole tool for imaging the internal surface of a borehole or casing comprising an inspection assembly as claimed in claim 1 connected to and deployed on electric line, slickline, or coiled tubing.

19. A downhole tool as claimed in claim 18 further comprising a bore configured to allow a flow of fluid through the tool.

20. A tool string comprising a downhole tool as claimed in claim 18 and at least one other downhole tool.

* * * * *